Patented Feb. 2, 1954

2,668,160

UNITED STATES PATENT OFFICE 2,668,160

STABILIZATION OF SULFONE RESINS

Charles Roney, Hammond, Ind., assignor to Ansul Chemical Company, Marinette, Wis., a corporation of Wisconsin No Drawing. Original application February 23, 1951, Serial No. 212,519, now Patent No. 2,606,169, dated August 5, 1952. Divided and this application June 27, 1952, Serial No. 296,073

8 Claims. (Cl. 260—45.85)

This invention relates to synthetic resins based on the product of the reaction between sulfur dioxide and an unsaturated hydrocarbon. More particularly it relates to stable or stabilized sulfone resins and to means for effecting stabilization of such resins.

This application is a division of application Serial No. 212,519, filed February 23, 1951, now Patent 2,606,169, August 5, 1952.

The preparation of sulfone resins as such is old in the art, but heretofore these resins have always "popped," foamed up or bubbled when exposed to high temperatures, as in a mold, and they have not been satisfactorily transparent. I have now been able to make such resins which do not have these disadvantages but which, on the other hand, are clear and transparent and do not "pop" and bubble in a mold. They are resistant to high temperatures and are also easily pigmented to produce attractively colored plastic objects.

An object of the invention is therefore a stabilized sulfone resin.

Another object is a stabilizer for resins formed from sulfur dioxide and unsaturated hydrocarbons.

Another object is a sulfone resin which is resistant to high temperatures.

Another object is a transparent sulfone resin.

Other objects will become apparent as the following detailed description proceeds.

In accordance with this invention I intermix a sulfone resin and esters of polyhydric alcohols as a stabilizer or stabilizers such as 1. Glycerol triacetate
2. Glycerol tribenzoate
3. Diethylene glycol acetate benzoate
4. Glycerol trisalicylate
5. Cresyl diglycol carbonate
6. Glucose penta-acetate
7. Sucrose octa-acetate Generally speaking, these ingredients are preferably employed in amounts from about 2% and to about 10% by weight of the resin. I have also found it advantageous to use more than 10% and even as much as 30% by weight of these stabilizers. Generally speaking, the use of less than about 5% by weight of these stabilizers will not have the desired stabilizing effect, although as little as 2% and even 1% by weight will have some beneficial effect on the transparency and clarity of the moldings.

The following is an illustrative specific example of the invention:

Example

A reaction vessel was filled with sulfur dioxide in the liquid phase, whereupon butene-2 amounting to one part for every four parts of sulfur dioxide was introduced. 0.05% by weight of potassium nitrate was added as a catalyst. The reaction was allowed to proceed for two hours. Then 10 parts by weight of acetone were added and 5 parts by weight of methanol were added further. This precipitated the resin, which was then filtered out, washed repeatedly with water, and dried. The resultant product was a white, clean, granular, resinous material, soluble in dioxane and in methylene chloride.

This resin was then mixed intimately with 10% of its weight of glycerol tribenzoate. The product thus stabilized was used for injection molding at a temperature of 200° C. and a pressure of 600 to 1000 pounds per square inch. The articles thus obtained were perfectly clear, and there was no sign of corrosion in the mold, nor sign of bubbling in the article.

This resin could not have been molded at all in the absence of the stabilizer because it would have decomposed violently and foamed up into a spongy mass.

In addition to the olefin-sulfur dioxide resins, disclosed in the foregoing example, made with butene-2, pentene-2, 2,4-dimethyl butadiene, 1-vinyl cyclohexene-3, styrene, and acrylonitrile, sulfone resins have been made with sulfur dioxide and other unsaturated compounds, including butene-1, pentene-1, propylene, ethylene, hexene-1, hexene-2, 2-methyl butene-2 and 2-methyl pentene-2 or mixtures thereof.

The molding temperature and pressure used with the resins of this invention are governed by the particular resin to be used and the article to be molded. Molding pressure may be as low as 25 pounds per square inch or as high as 6000 pounds per square inch to produce usable articles but is usually between 250 pounds per square inch and 3500 pounds per square inch. The molding temperature depends to some extent on the softening point of the particular resin it is desired to mold. The useful temperature has a range from about 100° C. to about 300° C., but preferred temperatures are in the range from about 150° C. to about 275° C.

While I do not wish to commit myself to any particular theory regarding the reason for the favorable results obtained, it is my belief that a concurrent plasticizing and stabilizing effect takes place, and the stabilization may depend on some partial condensation products which are removed from the reactive system by sulfur dioxide and are then dissolved in the stabilizing material present.

I claim:

1. An olefin-sulfur dioxide resin having incorporated therewith a monocarboxylic acid ester of a polyhydric alcohol, said ester consisting of carbon, hydrogen and oxygen, to render the resin substantially stable at a temperature above 100° C. and substantially clear and transparent under molding pressure.

2. An olefin-sulfur dioxide resin having incorporated therewith a monocarboxylic acid ester of a polyhydric alcohol, said ester consisting of carbon, hydrogen and oxygen, in amounts from about 2% to about 10% by weight of the resin to render the resin substantially stable at a temperature above 100° C. and substantially clear and transparent under molding pressure.

3. An olefin-sulfur dioxide resin having incorporated therewith glycerol tribenzoate to render the resin substantially stable at a temperature above 100° C. and substantially clear and transparent under molding pressure.

4. An olefin-sulfur dioxide resin having incorporated therewith diethylene glycol acetate benzoate to render the resin substantially stable at a temperature above 100° C. and substantially clear and transparent under molding pressure.

5. An olefin-sulfur dioxide resin having incorporated therewith glycerol trisalicylate to render the resin substantially stable at a temperature above 100° C. and substantially clear and transparent under molding pressure.

6. An olefin-sulfur dioxide resin having incorporated therewith cresyl diglycol carbonate to render the resin substantially stable at a temperature above 100° C. aand substantially clear and transparent under molding pressure.

7. An olefin-sulfur dioxide resin having incorporated therewith glycerol triacetate to render the resin substantially stable at a temperature above 100° C. and substantially clear and transparent under molding pressure.

8. An olefin-sulfur dioxide resin having incorporated therewith in amounts from about 2% to about 10% by weight of an ester selected from the group consisting of glycerol triacetate, glycerol tribenzoate, diethylene glycol acetate benzoate, glycerol trisalicylate, cresyl diglycol carbonate, glucose penta-acetate, and sucrose octa-acetate to render the resin substantially stable at a temperature above 100° C. and substantially clear and transparent under molding pressure.

CHARLES RONEY.

No references cited.